United States Patent
Spletzer et al.

(10) Patent No.: US 6,511,525 B2
(45) Date of Patent: Jan. 28, 2003

(54) METHOD AND APPARATUS FOR EXTRACTING WATER FROM AIR USING A DESICCANT

(75) Inventors: Barry L. Spletzer, Albuquerque, NM (US); Diane Schafer Callow, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/882,399

(22) Filed: Jun. 14, 2001

(65) Prior Publication Data

US 2002/0189448 A1 Dec. 19, 2002

Related U.S. Application Data

(63) Continuation-in-part of application No. 09/804,709, filed on Mar. 12, 2001, now Pat. No. 6,453,684, which is a continuation-in-part of application No. 09/439,105, filed on Nov. 29, 1999, now Pat. No. 6,230,503.

(51) Int. Cl.$^7$ .............................................. B01D 53/26
(52) U.S. Cl. ................. 95/41; 95/95; 95/121; 96/121; 96/128; 34/332; 34/469
(58) Field of Search .......................... 96/121, 122, 128, 96/143, 396; 95/41, 95, 117, 121; 62/93; 34/468, 469, 332

(56) References Cited

U.S. PATENT DOCUMENTS

| | | | |
|---|---|---|---|
| 3,810,346 A | | 5/1974 | Uratani |
| 4,027,993 A | | 6/1977 | Wolff ............................ 95/157 |
| 4,197,713 A | * | 4/1980 | Bulang ......................... 202/234 |
| 4,299,599 A | * | 11/1981 | Takeyama et al. ............ 96/122 |
| 5,699,673 A | | 12/1997 | Hoshino et al. |
| 5,857,344 A | * | 1/1999 | Rosenthal ...................... 62/117 |
| 6,230,503 B1 | * | 5/2001 | Spletzer .......................... 62/93 |
| 6,251,172 B1 | * | 6/2001 | Conrad .......................... 96/122 |
| 6,336,957 B1 | * | 1/2002 | Tsymerman .................. 95/115 |
| 6,360,549 B1 | * | 3/2002 | Spletzer et al. ................. 62/93 |

* cited by examiner

Primary Examiner—David A. Simmons
Assistant Examiner—Frank M. Lawrence
(74) Attorney, Agent, or Firm—V. Gerald Grafe; Susanna L. K. Rountree; Fred A. Lewis (57) ABSTRACT

The present invention provides a method and apparatus for extracting liquid water from moist air using minimal energy input. The method can be considered as four phases: (1) adsorbing water from air into a desiccant, (2) isolating the water-laden desiccant from the air source, (3) desorbing water as vapor from the desiccant into a chamber, and (4) isolating the desiccant from the chamber, and compressing the vapor in the chamber to form liquid condensate. The liquid condensate can be removed for use. Careful design of the dead volumes and pressure balances can minimize the energy required. The dried air can be exchanged for fresh moist air and the process repeated. An apparatus comprises a first chamber in fluid communication with a desiccant, and having ports to intake moist air and exhaust dried air. The apparatus also comprises a second chamber in fluid communication with the desiccant. The second chamber allows variable internal pressure, and has a port for removal of liquid condensate. Each chamber can be configured to be isolated or in communication with the desiccant. The first chamber can be configured to be isolated or in communication with a course of moist air. Various arrangements of valves, pistons, and chambers are described.

24 Claims, 6 Drawing Sheets

METHOD AND APPARATUS FOR EXTRACTING WATER FROM AIR USING A DESICCANT

PRIORITY CLAIM

This continuation-in-part application claims priority to application Ser. No. 09/804,709 "Method and Apparatus for Extracting Water from Air", filed Mar. 12, 2001, now U.S. Pat. No. 6,453,684, incorporated herein by reference. application Ser. No. 09/804,709 is a continuation-in-part application that claims priority to application Ser. No. 09/439,105 "Method and Apparatus for Extracting Water from Air", filed Nov. 29, 1999, now U.S. Pat. No. 6,230,503.

This invention was made with Government support under Contract DE-AC04-94AL85000 awarded by the U.S. Department of Energy. The Government has certain rights in the invention.

BACKGROUND OF THE INVENTION

This invention relates to the field of water-air interactions, specifically the extraction of water from moist air (a mixture of air and water vapor).

Water, especially potable water, is a constant need. Obtaining water is a threshold requirement for most human and animal activity. Obtaining water can be especially problematic in arid areas. Tremendous effort and expense currently go to drilling wells, building water transport systems, and purifying and desalinating water.

Water is conventionally obtained by purifying existing liquid water. Reverse osmosis, distillation, and filtration are used to purify contaminated water. Desalination is used to produce potable water from sea water. These approaches can be energy-intensive, and require the presence of liquid water as the starting material.

If liquid water is not available, then purification processes are not applicable. Dehumidification by refrigeration can be used to produce liquid water from moist air. Conventional refrigeration processes are very energy-intensive, however. Further, conventional refrigeration processes can involve large and complex machines. Consequently, conventional refrigeration processes are generally not economical for production of potable water.

Accordingly, there is a need for a method and apparatus for obtaining potable water from moist air that does not require the expense or complexity of conventional refrigeration processes.

SUMMARY OF THE INVENTION

The present invention provides a method and apparatus for extracting liquid water from moist air using minimal energy input. The method can be considered as four phases: (1) adsorbing water from air into a desiccant, (2) isolating the water-laden desiccant from the air source, (3) desorbing water as vapor from the desiccant into a chamber, and (4) isolating the desiccant from the chamber, and compressing the vapor in the chamber to form liquid condensate. The liquid condensate can be removed for use. Careful design of the dead volumes and pressure balances can minimize the energy required. The dried air can be exchanged for fresh moist air and the process repeated.

The apparatus comprises a first chamber in fluid communication with a desiccant, and having ports to intake moist air and exhaust dried air. The apparatus also comprises a second chamber in fluid communication with the desiccant. The second chamber allows variable internal pressure, and has a port for removal of liquid condensate. Each chamber can be configured to be isolated or in communication with the desiccant. The first chamber can be configured to be isolated or in communication with a course of moist air. Various arrangements of valves, pistons, and chambers are described.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

FIG. 3($a,b,c,d,e,f$) is a schematic representation of the apparatus of FIG. 2 in operation.

DETAILED DESCRIPTION OF THE INVENTION

The present invention provides a method and apparatus for extracting liquid water from moist air using minimal energy input. The method can be considered as four phases: (1) adsorbing water from air into a desiccant, (2) isolating the water-laden desiccant from the air source, (3) desorbing water as vapor from the desiccant into a chamber, and (4) isolating the desiccant from the chamber, and compressing the vapor in the chamber to form liquid condensate. The liquid condensate can be removed for use. Careful design of the dead volumes and pressure balances can minimize the energy required. The dried air can be exchanged for fresh moist air and the process repeated.

The apparatus comprises a first chamber in fluid communication with a desiccant, and having ports to intake moist air and exhaust dried air. The apparatus also comprises a second chamber in fluid communication with the desiccant. The second chamber allows variable internal pressure, and has a port for removal of liquid condensate. Each chamber can be configured to be isolated or in communication with the desiccant. The first chamber can be configured to be isolated or in communication with a course of moist air. Various arrangements of valves, pistons, and chambers are described. The method of the present invention can be understood from the description of the operation of the various embodiments described.

Example Embodiment

Figure 1:
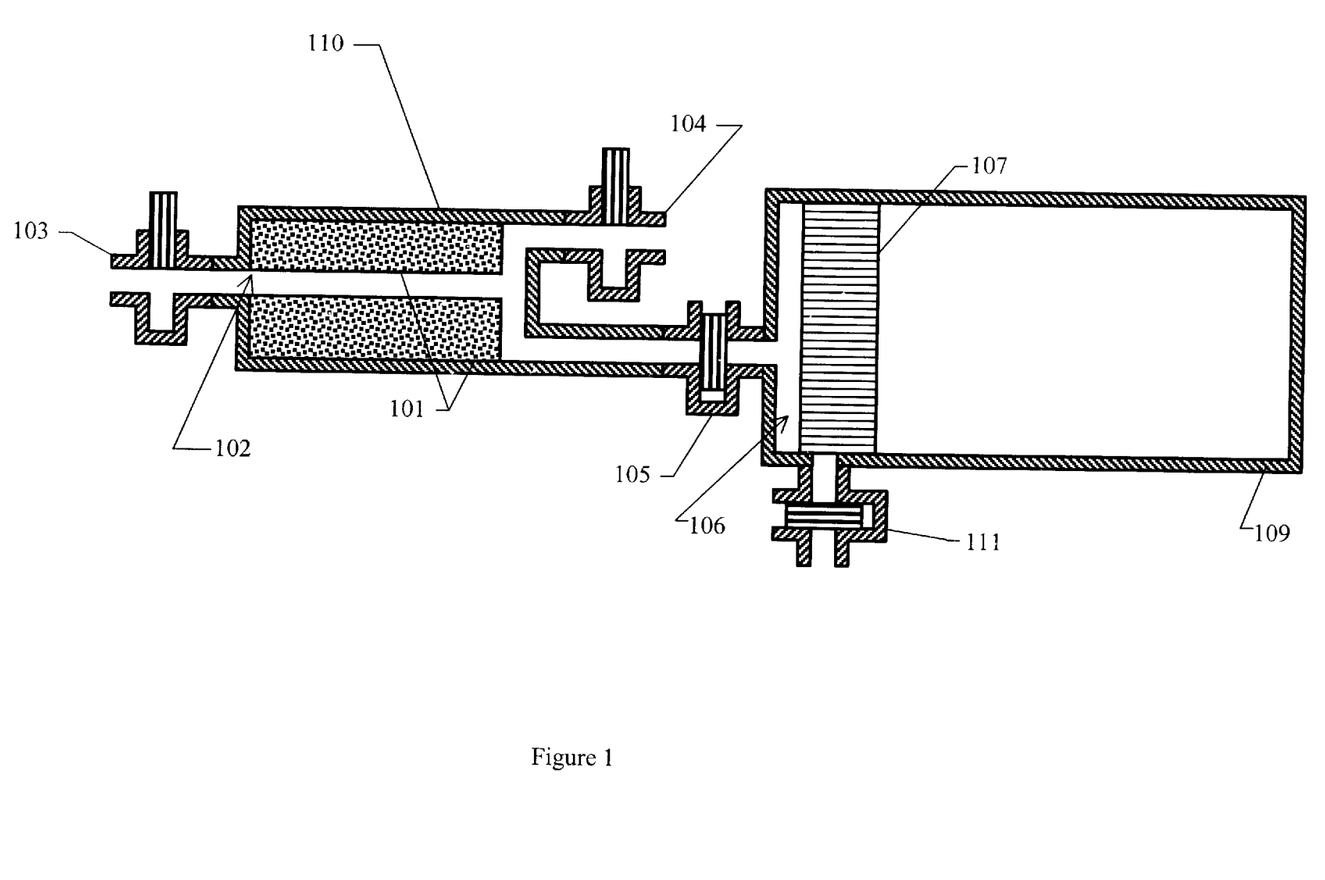
FIG. 1 is a schematic representation of an apparatus according to the present invention.

FIG. 1 is a schematic diagram of an embodiment of the present invention. Walls 110 define a flow path 102 from a valve-controlled air intake 103 to a valve-controlled air exhaust 104 (where "valve" includes any device, structure, or material interaction that controls flow of a fluid). Desiccant 101 is situated so as to be exposed to moist air in the flow path 102. Valve 105 controls fluid communication between desiccant 101 and chamber 106 defined by walls 109 and piston 107 moveable relative thereto. Condensate from chamber 106 can be removed via valve-controlled water port 111.

In operation, intake 103 and exhaust 104 valves are open, and inter-chamber valve 105 is closed. Air flows in flow path 102 over desiccant 101, allowing desiccant 101 to adsorb water from the air. After desiccant 101 has adsorbed sufficient water, then intake 103 and exhaust 104 valves can be closed, and inter-chamber valve 105 opened. Piston 107 begins at a position minimizing the volume of chamber 106. After inter-chamber valve 105 is opened, piston 107 can be moved to increase the volume of chamber 106, decreasing the pressure surrounding desiccant 101 and encouraging desorption of water vapor from desiccant 101 into chamber 106. After sufficient water vapor has desorbed into chamber 106, inter-chamber valve 105 can be closed, isolating chamber 106 from desiccant 101. Piston 107 can then be moved to reduce the volume of chamber 106, compressing the water vapor therein and fostering condensation. Condensation can then be drawn from chamber 106 as liquid water through water port 111.

Example Embodiment

Figure 2:
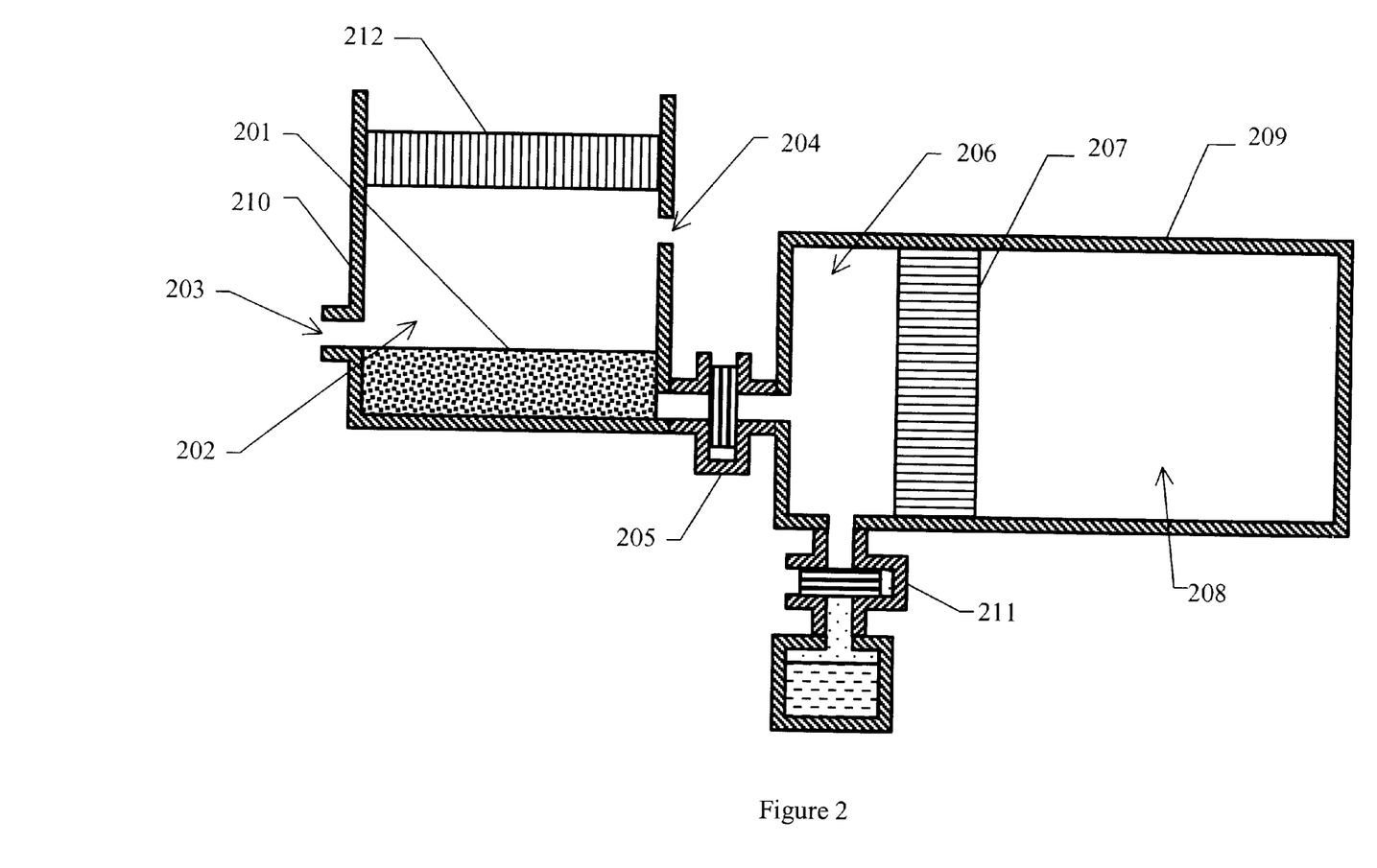
FIG. 2 is a schematic representation of an apparatus according to the present invention.

Varying the design of the previous example embodiment can reduce the energy required to extract water. FIG. 2 is a schematic diagram of an embodiment of the present invention considering the energy required. Walls 210 and an air piston 212 define a flow path 202 from an air intake 203 to an air exhaust 204. A desiccant 201 is situated so as to be exposed to moist air in the flow path 202. An air piston 212 is moveable between a first position, where the intake 203 and exhaust 204 ports are open, and a second position, where the intake 203 and exhaust 204 ports are closed and the air space adjacent the desiccant 201 is minimized (e.g., less than twice the desiccant volume, or less than 10% more than the desiccant volume).

Walls 209 define a volume separated into two chambers, a vacuum chamber 208 and a compression chamber 206, by a vacuum piston 207. The vacuum piston 207 is moveable within the volume, changing the volumes of the two chambers 208, 206. The vacuum piston can, for example, have a lapped sealing relationship with the walls, and can comprise a rolling diaphragm piston. An interchamber valve 205 controls fluid communication between the desiccant 201 and the compression chamber 206. A water collection valve 211 allows liquid water to be extracted from the compression chamber 206.

FIG. 3(a,b,c,d,e,f) illustrate the operation of the apparatus of FIG. 2. In FIG. 3a, air (e.g., atmospheric air) is passed over a desiccant 201 through intake 203 and exhaust 204 ports. The desiccant 201 adsorbs water from the air. Once the desiccant 201 has adsorbed sufficient water (e.g., reached saturation), an air piston 212 moves toward the desiccant 201 until it has expelled the remaining air from the flow path 202 and closed both ports 203, 204. The air piston 212 itself closes the ports 203, 204 in the embodiment illustrated, obviating separate intake and exhaust valves. The air piston 212 can move toward the desiccant 201 until it is in contact with the desiccant 201, as in FIG. 3b, leaving a minimum dead volume. If both sides of the air piston 212 are exposed to the same air source (e.g., atmospheric), the pressure differential across the air piston 212 is substantially zero, and the work required to move the air piston 212 is minimal. Minimizing the dead volume, around the desiccant 201 and in any valves, can be important for efficiency. Additional dead volume requires additional work in later phases of the operation.

Figure 3A:
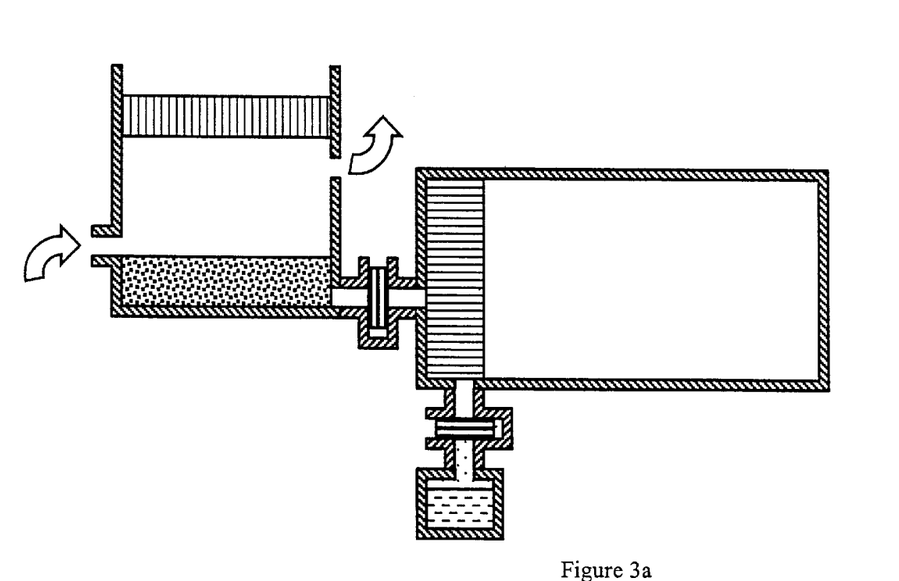
Figure 3B:
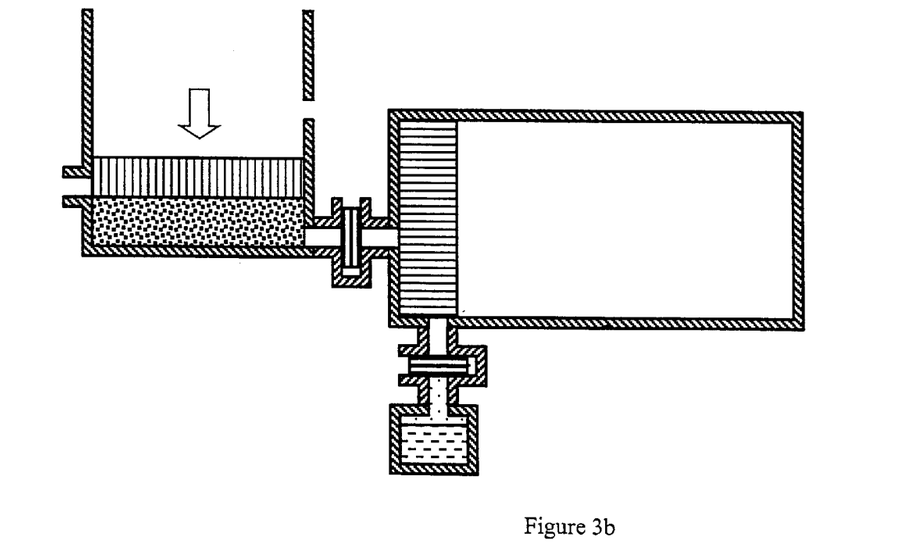
Figure 3C:
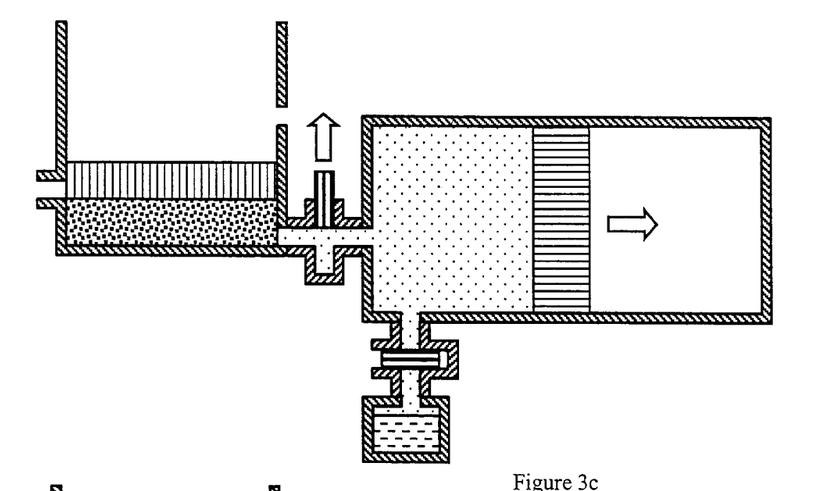
Figure 3D:
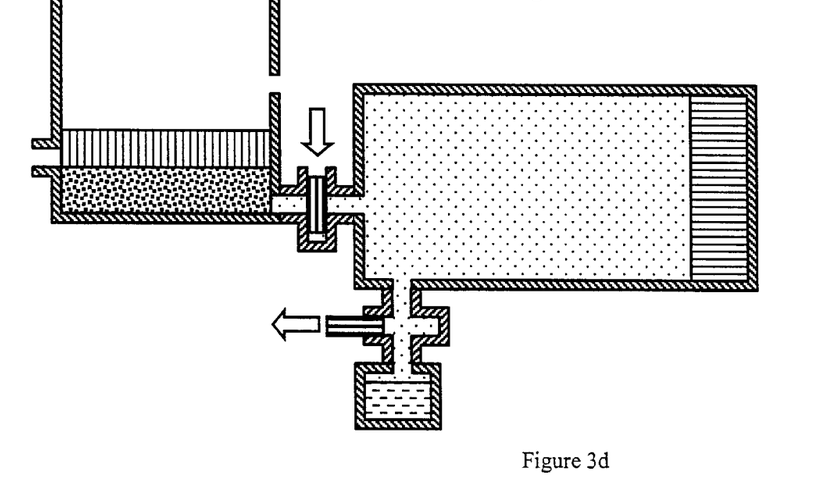

After the air piston 212 is moved toward the desiccant 201, an interchamber valve 205 can be opened to allow fluid communication from the desiccant 201 to the compression chamber 206. The vacuum piston 207 can move to increase the volume of the compression chamber 206 (move to the right in the figure). If the vacuum chamber 208 is maintained at roughly a vacuum, little energy is required to move the vacuum piston 207 since the pressure differential across the vacuum piston 207 is roughly zero. As the vacuum piston 207 moves, the pressure in the compression chamber 206 drops until it reaches the vapor pressure of the water in the desiccant 201. At this point water begins to be desorbed from the desiccant 201, as in FIG. 3c. After sufficient water has desorbed from the desiccant 201 into water vapor in the compression chamber 206, the interchamber valve 205 can be closed, isolating the desiccant 201 from the compression chamber 206, and the water capture valve 211 can be opened, allowing liquid water to leave the compression chamber 206, as shown in FIG. 3d. After the desiccant 201 is isolated from the compression chamber 206, the air piston 212 can move away from the desiccant 201 and allow air to flow over the desiccant 201, repeating the initial adsorption phase.

Figure 3E:
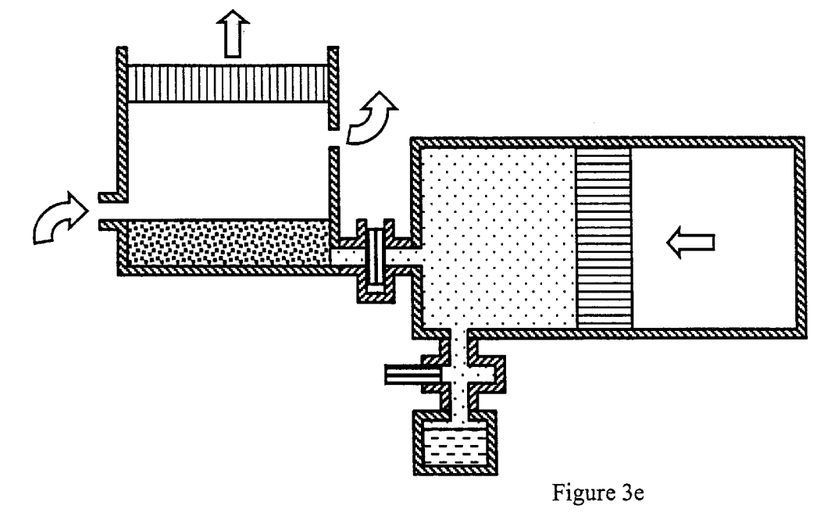
Figure 3F:
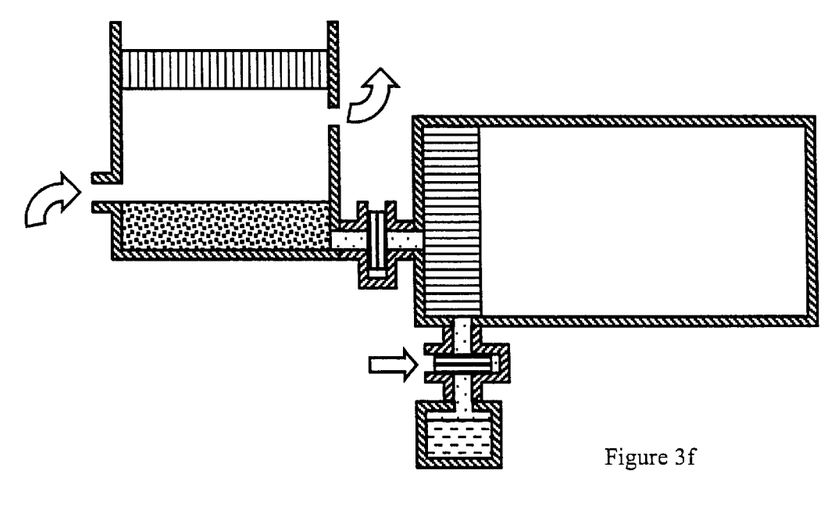

The vacuum piston 207 can then move to compress the water vapor in the compression chamber 206 (move to the left in FIG. 3e). When the pressure in the compression chamber 206 exceeds the saturation pressure of the water vapor, condensation occurs. As before, minimizing dead volume can reduce the amount of energy required to achieve sufficient compression. Also, using a liquid-vapor pressurization system in the vacuum chamber 208 can minimize the pressure differential across the vacuum piston 207, minimizing the energy required to expand and the compress compression chamber 206. Maintaining the vacuum chamber 208 at a pressure less than the pressure of the air flowing over the desiccant can allow for lower required energy; maintaining at a pressure not more than the vapor pressure of water in the desiccant can be suitable. The absolute pressure required to foster condensation can be several times the water saturation pressure (on the order of 50 Pa–10,000 Pa depending on the temperature) since there is very little air in the compression chamber 206. As the water condensed it can drain through the water collection valve 211. Vacuum piston movement can also collect condensation from the walls 209 and guide it to the water collection valve 211. When the vacuum piston 207 returns to its initial position as illustrated in FIG. 3f, the water collection valve 211 can be closed and the expansion/compression phases repeated once the desiccant 201 has again adsorbed sufficient water from the air.

Example Embodiment

Figure 4:
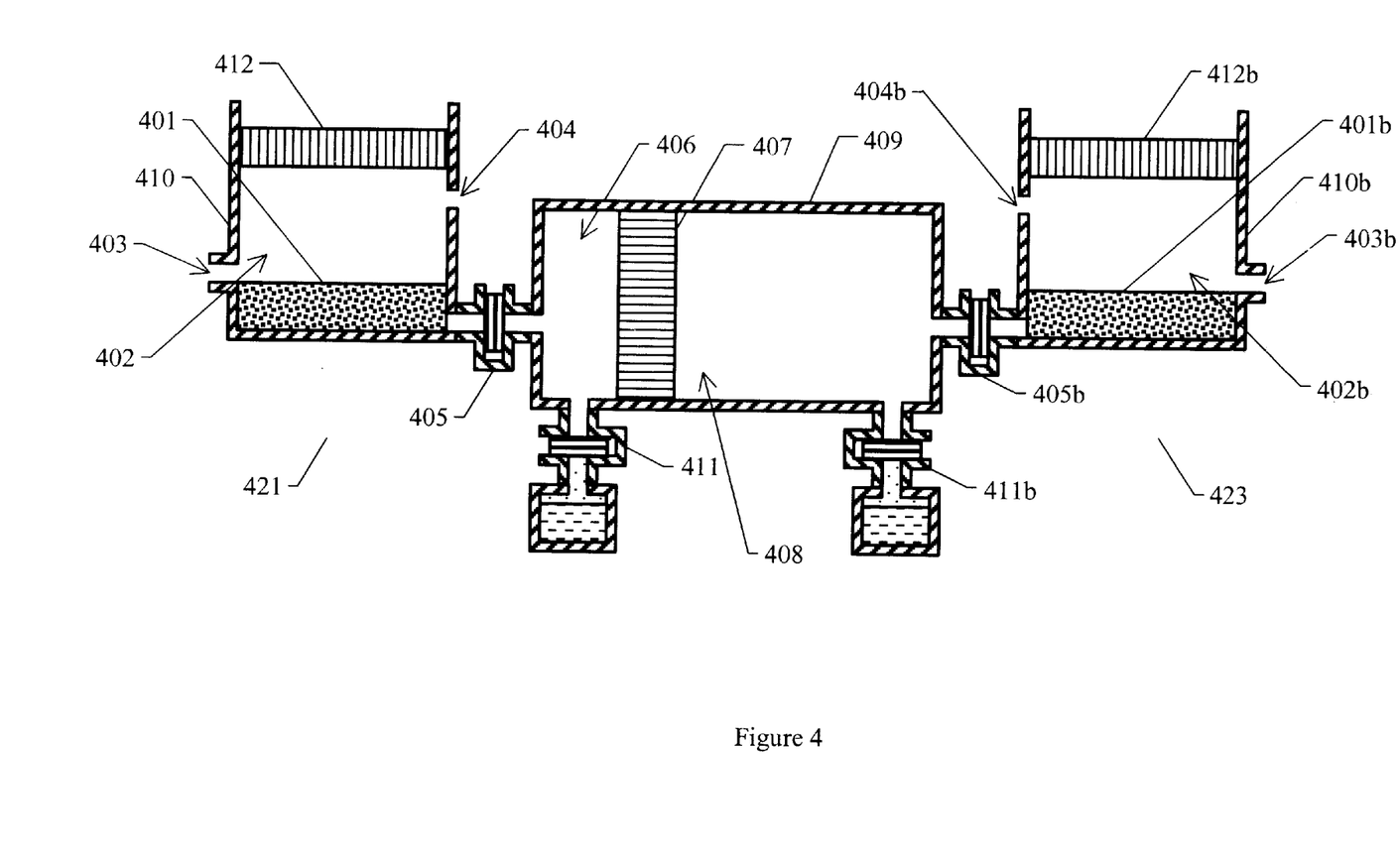
FIG. 4 is a schematic representation of an apparatus according to the present invention.

A second desiccant adsorption subsystem can be added to the previous example embodiment. FIG. 4 is a schematic diagram of such an embodiment. Two desiccant adsorption subsystems 421, 423 mount and operate with two compression chambers 406 and 408 defined by vacuum piston 407. Compression chamber 406 operates with one desiccant adsorption subsystem 421 and compression chamber 408 operates with the other desiccant adsorption subsystem 423. Subsystem 421 is comprised of walls 410, air piston 412, desiccant 401, walls 409, compression chamber 406, vacuum piston 407, interchamber valve 405 and water collection valve 411. The air piston 412 defines a flow path 402 from an air intake 403 to an air exhaust 404. Subsystem 423 is comprised of walls 410b, air piston 412b, desiccant 401b, walls 409, compression chamber 408, vacuum piston 407, interchamber valve 405b and water collection valve 411b. The air piston 412b defines a flow path 402b from an air intake 403b to an air exhaust 404b. Each desiccant adsorption subsystem operates with its compression chamber substantially as described above. Each compression chamber operates as the vacuum chamber described above for the other compression chamber. A single piston can therefore serve as a compression piston for roughly twice the processing capacity of the previous embodiment. Each compression chamber is exposed to a pressure of approximately the water vapor pressure in the corresponding desiccant, so the pressure differential across the piston between the chambers is very low. Consequently, the energy required to move the piston can be very low. Further, the size of the overall two desiccant apparatus can be smaller than would be required for two of the previous single desiccant apparatus.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A method of extracting water from a quantity of moist air, comprising:
    a) exposing a desiccant to moist air under pressure and temperature conditions that encourage adsorption of water by the desiccant from the moist air, producing a moisture-laden desiccant and dried air;
    b) separating the moisture-laden desiccant from a portion of the dried air;
    c) exposing the moisture-laden desiccant to pressure and temperature conditions that encourage desorption of water vapor from the moisture-laden desiccant, producing desorbed water vapor and a dried desiccant;
    d) collecting a portion of the desorbed water vapor in a condensation chamber and isolating the condensation chamber from the dried desiccant;
    e) increasing the pressure in the condensation chamber to a pressure that encourages condensation of liquid water from the desorbed water vapor;
    f) collecting a portion of the condensation from the condensation chamber.

2. A method of extracting water from a quantity of moist air, comprising:
    a) exposing a desiccant to moist air under substantially atmospheric temperature and pressure, producing a moisture-laden desiccant and dried air;
    b) isolating the moisture-laden desiccant from a portion of the dried air;
    c) reducing the pressure surrounding the moisture-laden desiccant to a pressure that encourages desorption of water vapor from the moisture-laden desiccant, producing water vapor and a dried desiccant;
    d) collecting a portion of the desorbed water vapor in a condensation chamber and isolating the condensation chamber from the dried desiccant;
    e) increasing the pressure in the condensation chamber to a pressure that encourages condensation of liquid water from the desorbed water vapor;
    f) collecting water from the condensation in the condensation chamber.

3. A method of extracting water from a quantity of moist air, comprising:
    a) configuring a first chamber containing moisture-adsorbing desiccant in fluid communication with a source of moist air;
    b) after the desiccant has adsorbed water from the moist air, exhausting dried air from the first chamber;
    c) configuring a second chamber in fluid communication with the desiccant;
    d) reducing the pressure in the second chamber, encouraging water vapor from the desiccant into the second chamber;
    e) configuring a third chamber containing water vapor and substantially not in fluid communication with the desiccant;
    f) increasing the pressure in the third chamber sufficient to cause water vapor to condense to liquid water;
    g) collecting liquid water from the third chamber.

4. A method of extracting water from moist air using an apparatus comprising a first chamber defined by first walls and a first piston, a second chamber defined by second walls and a second piston, and a desiccant, where the first and second chambers are configurable to be in either fluid communication or fluid isolation relative to the desiccant, said method comprising:
    a) configuring the first chamber to be in fluid communication with the desiccant, and introducing a quantity of moist air;
    b) after the desiccant has adsorbed water from the moist air, exhausting air from the first chamber;
    c) configuring the second chamber to be in fluid communication with the desiccant;
    d) expanding the second chamber to desorb water from the desiccant into water vapor in the second chamber;
    e) configuring the second chamber to be in fluid isolation relative to the desiccant;
    f) compressing the water vapor in the second chamber to form liquid condensate.

5. An apparatus for the extraction of water from air, comprising:
    a) a desiccant;
    b) a first chamber defining an air path from an air intake port over the desiccant to an air exhaust port;
    c) an intake valve mounted with the first chamber to control flow through the intake port;
    d) an exhaust valve mounted with the first chamber to control flow through the exhaust port;
    e) a second chamber
    f) an interchamber valve mounted between the first and second chambers to control flow between the desiccant and the second chamber and to isolate the desiccant from the second chamber;
    g) means for varying the pressure in the second chamber; and
    h) means for removing condensate from the second chamber.

6. The apparatus of claim 5, wherein the means for varying the pressure in the second chamber comprises a piston moveable within the second chamber to vary the volume of the second chamber.

7. The apparatus of claim 5, wherein the means for removing condensate from the second chamber comprises a valve controlling water flow through a condensate port from the second chamber.

8. An apparatus for the extraction of water from air, comprising:
    a) a desiccant;
    b) a first chamber defining an air path from an air intake port over the desiccant to an air exhaust port;

c) a first piston mounted with the first chamber, moveable between first and second positions, where in the first position the first piston substantially prevents fluid communication between the air intake port and the first chamber, and substantially prevents fluid communication between the air exhaust port and the first chamber; and where in the second position the first piston does not prevent fluid communication between the air intake port, the air exhaust port, and the first chamber;

d) a second chamber, divided into a compression portion and a vacuum portion by a second piston moveable within the second chamber;

e) an interchamber valve controlling fluid flow between the first chamber and the compression portion of the second chamber;

f) means for collecting condensate from the compression portion of the second chamber.

9. The apparatus of claim 8 wherein the means for collecting condensate from the compression portion of the second chamber comprises a valve controlling fluid flow from the compression portion of the second chamber.

10. The apparatus of claim 8 wherein the first piston comprises a first surface facing the first chamber and a second surface facing away from the first chamber, and wherein fluid at substantially the same pressure as air at the air intake port contacts the second surface.

11. The apparatus of claim 8 wherein when the first piston is in the first position the first piston causes the volume of the first chamber to be not more than twice the volume required to accommodate the desiccant.

12. The apparatus of claim 8 wherein when the first piston is in the first position the first piston causes the volume of the first chamber to be not more than 10% more than the volume required to accommodate the desiccant.

13. The apparatus of claim 8 wherein the vacuum portion of the second chamber is maintained at a pressure lower than the pressure of air in the air path.

14. The apparatus of claim 8 wherein the vacuum portion of the second chamber is maintained at a pressure not more than the vapor pressure of the water in the desiccant.

15. The apparatus of claim 8 wherein the pressure in the vacuum portion of the second chamber is maintained by a liquid-vapor pressurization system.

16. The apparatus of claim 8 wherein the second piston has a lapped sealing relationship with the second chamber.

17. The apparatus of claim 8 wherein the second piston comprises a rolling diaphragm piston.

18. The apparatus of claim 8 wherein the means for collecting condensate comprises a condensate trap and a relief valve.

19. An apparatus for the extraction of water from air, comprising:

a) first and second desiccant adsorption units, where each desiccant adsorption unit comprises:
i) a desiccant;
ii) a first chamber defining an air path from an air intake port over the desiccant to an air exhaust port;
iii) a first piston mounted with the first chamber, moveable between first and second positions, where in the first position the first piston substantially prevents fluid communication between the air intake port and the first chamber, and substantially prevents fluid communication between the air exhaust port and the first chamber; and where in the second position the first piston does not prevent fluid communication between the air intake port, the air exhaust port, and the first chamber;

b) a second chamber, divided into a first compression portion and a second compression portion by a compression piston moveable within the second chamber;

c) a first interchamber valve controlling fluid flow between the first chamber of the first desiccant adsorption unit and the first compression portion of the second chamber;

d) a second interchamber valve controlling fluid flow between the first chamber of the second desiccant adsorption unit and the second compression portion of the second chamber;

e) means for collecting condensate from the first compression portion of the second chamber;

f) means for collecting condensate from the second compression portion of the second chamber.

20. The apparatus of claim 19 wherein the first piston of each desiccant adsorption unit comprises a first surface facing the first chamber of the desiccant adsorption unit and a second surface facing away from the first chamber of the desiccant adsorption unit, and wherein fluid at substantially the same pressure as air in the air path of the desiccant adsorption unit contacts the second surface.

21. The apparatus of claim 19 wherein when the first piston of each desiccant adsorption unit is in the first position the first piston of the desiccant adsorption unit causes the volume of the first chamber of the desiccant adsorption unit to be not more than twice the volume required to accommodate the desiccant of the desiccant adsorption unit.

22. The apparatus of claim 19 wherein when the first piston of each desiccant adsorption unit is in the first position the first piston of the desiccant adsorption unit causes the volume of the first chamber of the desiccant adsorption unit to be not more than 10% more than the volume required to accommodate the desiccant of the desiccant adsorption unit.

23. The apparatus of claim 19 wherein the second piston has a lapped sealing relationship with the second chamber.

24. The apparatus of claim 19 wherein the second piston comprises a rolling diaphragm piston.

* * * * *